United States Patent [19]

Yoshikawa

[11] 4,367,110

[45] Jan. 4, 1983

[54] DECORATIVE LAMINATE AND A MANUFACTURING METHOD THEREFOR

[75] Inventor: Akira Yoshikawa, Tokyo, Japan

[73] Assignee: Toppan Printing Co., Japan

[21] Appl. No.: 163,689

[22] Filed: Jun. 27, 1980

[30] Foreign Application Priority Data

Jul. 2, 1979 [JP] Japan .................................. 54-83751
Jul. 6, 1979 [JP] Japan ............................ 54-93200[U]
Jul. 18, 1979 [JP] Japan ............................ 54-99223[U]
Aug. 17, 1979 [JP] Japan ................................ 54-105205

[51] Int. Cl.³ ............................................. B32B 31/00
[52] U.S. Cl. ...................................... 156/219; 156/89; 156/289; 156/581; 264/60; 264/219; 264/293; 427/193
[58] Field of Search ....................... 427/193, 197, 198; 425/500, 406, 412; 264/60, 62, 219, 225, 284, 293; 156/89, 209, 219, 220, 289, 581; 101/18, 21, 28, 29, 31, 32

[56] References Cited

U.S. PATENT DOCUMENTS

| 2,002,806 | 5/1935 | Weierich | 427/193 |
| 3,052,590 | 9/1962 | Maros et al. | 156/583.4 X |
| 3,663,349 | 5/1972 | Venturino |  |
| 3,814,647 | 6/1974 | Scher et al. | 156/219 |

FOREIGN PATENT DOCUMENTS

| 981124 | 1/1976 | Canada . |
| 1460310 | 10/1966 | France . |
| 1528741 | 5/1968 | France . |
| 1579534 | 7/1969 | France . |
| 2087449 | 12/1971 | France . |
| 2205860 | 5/1974 | France . |
| 2330538 | 6/1977 | France . |

*Primary Examiner*—William A. Powell
*Attorney, Agent, or Firm*—Bacon & Thomas

[57] ABSTRACT

A laminated thermosetting decorative sheet has a three-dimensional pattern on its surface which consists of protruding parts and recessed parts forming smooth curves. This decorative laminate is manufactured by using a press plate having an enamel layer on the surface of a metal substrate.

5 Claims, 9 Drawing Figures

DECORATIVE LAMINATE AND A MANUFACTURING METHOD THEREFOR

BACKGROUND OF THE INVENTION

The present invention relates to a decorative laminate using thermosetting resin and a manufacturing method therefor.

Decorative laminates can provide various surface shapes, colors, glosses and volumes resembling wood, enamel, pottery, tile, cloisonne ware, natural stone and so on, and they are widely used as raw materials for furniture and building materials. These kinds of decorative laminates are manufactured by impregnating a printed decorative sheet having a printed wood grain or a printed enamel pattern with a thermosetting resin; laminating the printed decorative sheet with core papers, an overlay paper or the like; and hot pressing the laminated body using a predetermined embossing press plate.

For forming a three-dimensional pattern or a roughened surface for reducing gloss, methods have been proposed such as embossing using an etched or sand blasted metal press plate. However, the procedure for manufacturing such a metal press plate is complex, and the derived metal press plate is extremely expensive. Thus, it has been general practice to manufacture resin press plates using a metal press plate as an original, and to use these resin press plates for actual embossing. However, a resin press plate of, for example, phenol resin or epoxy resin is defective in that a release sheet must be used to prevent adhesion between the plate and the decorative laminate. Its durability has not been satisfactory, either. Further, for various decorative laminates of thermosetting resin, a printed decorative sheet is used which has a printed pattern of an abstract pattern, wood texture, stone grain, a pattern of brick or ceramic, or various other patterns. Even when this printing is very fine, the design of the decorative laminate may not be satisfactory if the resin layer at the surface of the decorative laminate does not have a three-dimensional pattern or a gloss which goes well with the printing. For manufacturing this kind of decorative laminate, a so-called wiping method is known according to which a decorative laminate is molded using a press plate with a three-dimensional pattern formed by etching the surface of a metal plate such as stainless steel; then the recess of the derived decorative laminate is painted with ink. However, with this method, it is extremely difficult in practice to select an ink which strongly adheres to the surface of the decorative laminates and which still presents the other required properties. For example, even when a transparent resin is coated over the ink layer for protecting the ink layer, it is very difficult to obtain the original surface conditions and properties of the decorative laminate of thermosetting resin. Further, in a metal press plate manufactured by etching or sand blasting, the inclination of the protruding and recessed parts is sharp, the protruding part is generally smooth, and the recessed part is rough. Thus, decorative laminate manufactured using such a metal press plate have been defective in their reproduction of the surfaces of the enamel and the natural materials.

SUMMARY OF THE INVENTION

The primary object of the present invention is, therefore, to provide a laminated thermosetting decorative sheet with improved design.

Another object of the present invention is to provide a method for manufacturing a laminated thermosetting decorative sheet using a press plate which is improved in releasing ability and durability and which is inexpensive.

The present invention provides a decorative laminate which has a smooth three-dimensional pattern and which preferably has a varied surface luster or gloss pattern due to the formation of a rough part.

As a preferred embodiment of the present invention, a decorative laminate is provided which is shaped in continuous curves formed by alternate protruding parts and recessed parts.

A decorative laminate according to the present invention may be easily manufactured using a press plate having an enamel layer formed on a metal substrate, this enamel layer having a three-dimensional pattern or a rough surface.

DETAILED DESCRIPTION OF THE PREFERRED EMBODIMENTS

Figure 1:
FIG. 1 is a schematic sectional view of a conventional decorative laminate.
Figure 2:
FIG. 2 is a schematic sectional view of a decorative laminate according to an embodiment of the present invention.

As may be seen from FIG. 1, in the surface of a decorative laminate 1 manufactured with a conventional metal or resin press plate, the sharp protruding and recessed parts of the press plate is reproduced and a smooth pattern of a protruding and recessed parts cannot be obtained. To the contrary, as shown in FIG. 2, a decorative laminate 2 according to the present invention has a smoother surface than a conventional decorative laminate. Therefore, the decorative laminate of the present invention is advantageous in that its three-dimensional surface is smooth and suitable for reproducing three-dimensional patterns resembling enamel, pottery, tiles, cloisonne ware, natural stone and so on.

Figure 3:
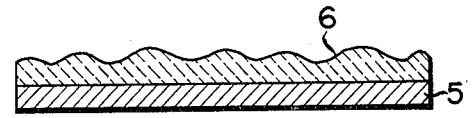
FIG. 3 is a schematic sectional view of an embossing press plate having an enamel layer and used in the present invention.

The decorative laminate of the present invention is manufactured with a press plate or an embossing plate which has an enamel layer 6 on a metal substrate 5 of steel, cast iron, copper, aluminum, stainless steel or the like as shown in FIG. 3. The enamel layer 6 is formed by coating the substrate with a general glaze and firing it. A press plate suitable for manufacturing a decorative laminate of various patterns is manufactured by forming a three-dimensional pattern and a luster pattern, that is, roughened parts on the surface of the enamel layer. The press plate having the enamel layer has been proved to be advantageous in manufacturing a laminated thermosetting decorative sheet in the following respects:

(1) A sufficient releasing ability is obtained with thermosetting resins such as melamine formaldehyde resins since the surface of the enamel layer is very hard and fine.

(2) Formation of protruding parts on the surface of the enamel layer may be relatively easily accomplished, for example, by means of screen printing with frit ink.

(3) Roughening the protruding parts may be easily accomplished by methods such as mixing a matting agent into the frit ink.

Although the press plate is described with reference to a plate shape, it may take a roll shape.

Figure 4:
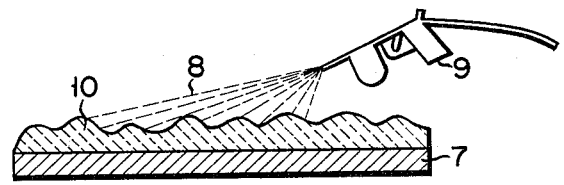
FIG. 4 is a schematic view illustrating an embodiment of a method for manufacturing an embossing press plate having an enamel layer.
Figure 5:
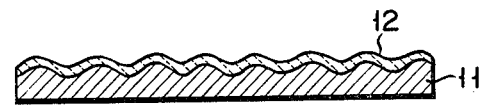
FIGS. 5 and 6 are sectional views illustrating embodiments of an embossing press plate having an enamel layer.
Figure 6:
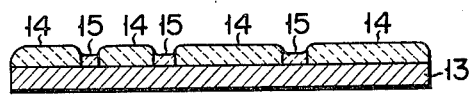

The process of forming recessed parts and protruding parts on the enamel layer of the press plate will be described. For forming smooth recessed parts and protruding parts on the enamel surface of the substrate, a method as shown in FIG. 4 is possible according to which a glaze 8 is sprayed by a spray gun 9 onto the surface of a substrate 7 and then fired to form a surface 10 with a random three-dimensional pattern. Alternatively, as shown in FIG. 5, after uniformly applying a glaze on the three-dimensional pattern of a substrate 11, a three-dimensionally patterned surface 12 is formed by firing. Still alternatively, as shown in FIG. 6, glazes of more than one kind with different melting points are applied to the surface of a substrate 13 in a pattern or at random. A three-dimensional pattern is formed by firing at a temperature capable of firing the glaze 14 of the highest melting temperature and by melting the glaze or glazes 15 of lower melting temperature. The surface of a decorative laminate embossed with a press plate manufactured in one of these manners has a smooth three-dimensional pattern as shown in FIG. 2.

A decorative laminate with a continuous curved surface formed by alternate recessed parts and protruding parts will be described as a preferred embodiment of a decorative laminate manufactured with a press plate having an enamel layer with a smooth three-dimensional pattern.

The press plate to be used in this embodiment may be prepared by pre-treating a metal substrate with processes such as degreasing; using a spray gun to coat the substrate with a slip obtained by adding a mill addition agent and water to a glass frit and grinding and kneading the mixture in a ball mill; and firing the coated substrate. The frit to be used may be of the general kind and has as its main components, for example, $SiO_2$, $Al_2O_3$, $B_2O_3$, $Na_2O$, $K_2O$, $CaO$, $ZnO$, $MgO$ and the like. The mill addition agent may be a suspending material such as clay, an emulsifying material such as tin oxide, a colorant borax or an electrolytic material such as magnesium carbide. The firing is performed at a temperature higher than the melting temperature of the frit, generally in the range of 500°–900° C. The molten frit is in the form of a viscous liquid so that the surface tension tends to minimize the surface area. This, together with the flowability of the molten frit, serves to soften the sharpness of the recessed and protruding parts to form rounded recessed and protruding parts. It is possible to obtain the most suitable flowability and the same roundness at the recessed and protruding parts by appropriately selecting the composition of the frit and the temperature conditions. Thus, an enamel layer which smoothly conforms to the surface of the metal substrate and which has recessed parts and protruding parts of similar dimensions may be obtained. Although the three-dimensional pattern of the enamel layer of the press plate and the three-dimensional pattern of the decorative laminate obtained by using the press plate are opposite, they are similar in outer appearance. Therefore, the three-dimensional pattern of the enamel layer may not have to be made opposite to the three-dimensional pattern of the decorative laminate to be manufactured. Thus, it is possible to obtain a press plate which has a sinusoidally curved surface formed by alternate recessed parts and protruding parts, that is, a horizontally symmetrical curve.

Figure 7:
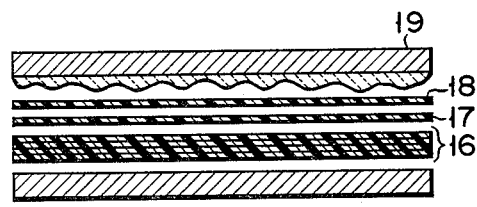
FIG. 7 is a schematic sectional view illustrating a method for hot pressing a decorative laminate elements with the press plate shown in FIG. 3.

A laminated thermosetting decorative sheet is manufactured by a conventional method using such a press plate. The thermosetting resin to be used here may be a melamine formaldehyde resin, diallylphthalate resin, a polyester resin, a guanamine resin or the like. As shown in FIG. 7, a decorative laminate elements such as core papers 16 impregnated with resin, a printed decorative sheet 17 on which is printed a desired pattern and which is impregnated with resin, and an overlay paper 18 impregnated with resin is laminated. A press plate 19 is placed thereover so that its enamel layer having a three-dimensional pattern is in contact with the overlay paper 18. Plywood may be used instead of the core papers as desired. A decorative laminate with a smooth three-dimensional pattern and with a luster corresponding to the enamel is obtained by hot pressing. This decorative laminate does not have sharp angles in the three-dimensional pattern so that it does not give an unnatural appearance, dust does not tend to collect at its recessed parts, and cleaning is easy.

EXAMPLE 1

Treatments such as degreasing were performed on a steel plate of 1.6 mm in thickness. Slip was prepared which consists of frit having as its main components $SiO_2$, $B_2O_3$, $Al_2O_3$, $Na_2O$ and the like; water; a suspending material such as GAIROME clay (fire clay); and other additives. Slip was sprayed with a spray gun on one surface of the steel plate to form a random three-dimensional pattern thereon. Firing at 850° C. was performed for three minutes, and an embossing press plate having an enamel layer on its surface was obtained. This embossing plate was used for forming a decorative laminate of melamine formaldehyde resin. Thus, decorative laminates of melamine formaldehyde resin with a smooth three-dimensional pattern and improved luster were obtained. No defects were noted on the embossing press plate after over a hundred repeated embossings, regardless of the fact that hot pressing was performed at a temperature of 140° C. and a pressure of 80 kg/cm$^2$.

Another method for forming a three-dimensional pattern on a press plate will be described.

Figure 8:
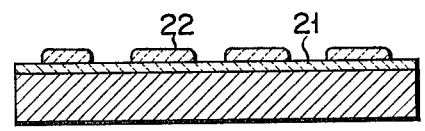
FIGS. 8 and 9 are sectional views illustrating other embodiments of an embossing press plate having an enamel layer.

After forming an enamel layer by a conventional method on a metal substrate, protruding parts or recessed parts may be formed. For example, as shown in FIG. 8, it is possible to print a protruding pattern 22 on the surface of an enamel layer 21 by screen printing using an ink having a glass content of over 10%, e.g., frit ink, and then firing. It is also possible to apply an adhesive in a desired pattern on the surface of the enamel layer, to scatter glass powder called frit thereover, and to fire after removing the frit on parts other than the pattern. It is further possible to form a protruding pattern on the surface of the enamel layer by using a transfer sheet with a pattern formed on a sheet such as a paper sheet or a plastic film by ink containing a pigment and frit and firing.

In the embodiment shown in FIG. 8, for the enamel layer, a slip may be used as explained in FIGS. 4 to 6, that is, a glaze which is prepared by adding a mill addition agent to a commercially available enamel frit and by grinding the mixture in a ball mill. The coating method may be arbitrarily selected. However, coating may be generally accomplished by spraying when the press plate has large dimensions.

The finished conditions of the surface of the enamel layer 21 may be varied by suitably selecting the kinds of frit and mill addition agent to be used, the viscosity of the slip when coated, the coating method, the firing temperature and the like. That is, a desired finished condition may be formed on the surface varying from an even condition to a slightly and smoothly waving condition. For forming a three-dimensional pattern, methods mentioned above may be adopted. Easy methods among these are to increase the viscosity of the slip, to degrade the leveling, or to enlarge the diameter of the drops of slip by decreasing the air pressure of the spray gun. In this case, fluctuations in the height of the pattern in the enamel layer need to be kept in a certain range since too much fluctuation tends to cause irregular transfer of ink on the layer in screen printing or in the transfer procedure. As for the luster of the surface of the enamel layer, an arbitrarily selected degree of luster may be obtained varying from a condition corresponding to a completely mirror surface to a completely matted surface. Matting of the surface of the enamel layer may be easily accomplished by adding a matting agent to the glaze or by lowering the firing temperature. Further, the surface conditions of the protruding parts of the enamel layer may also be changed by the technique mentioned above. In either case, the enamel layer should not be too thick, preferably below 500µ. If it is too thick, it might lead to a breakage due to the pressure in hot pressing.

Methods for forming protruding parts 22 on the surface of the firing enamel layer 21 by screen printing or by transfer as in FIG. 8 will be described in more detail.

The method utilizing screen printing will first be described. The printing screen may be one using a screen of 150-200 mesh or, more preferably for the present method, one using a thick screen of 60-70 mesh. In the latter case, since the thickness of the ink layer is great, the decorative laminate manufactured will have excellent three-dimensional effects. The mesh, wire diameter, thickness of the screen, screen material to be used and the like are determined according to the desired effects, the desired fineness of the pattern and so on, but a screen of 30-250 mesh using monofilament threads or multi-filament threads of nylon or polyester is generally used. As for the screen ink, commercially available frit ink is used, that is, commercially available printing glass frit which is finely ground and kneaded in screen oil.

The method utilizing transfer will now be described. A predetermined pattern of frit ink is printed on a surface of a base material such as a paper sheet or a film by a desired printing method such as the screen printing or photo gravure printing. Screen printing enables the printing of thick patterns, and photo gravure printing enables the printing of fine patterns. The transfer method may be arbitrarily selected from conventional methods such as a method for forming a varnish transfer layer on the surface of the enamel layer and for transferring by pressing, or a method for forming a varnish transfer layer on the surface of the transfer paper and for transferring it directly to the surface of the enamel layer. The transfer method is advantageous in that the transfer paper may be printed in advance and the actual transfer may be easily accomplished by the water transferring method or with a simple machine. However, the thickness of the formed ink layer is limited and the height of the raised ink layer is slightly inferior in comparison with the direct printing method of screen printing.

Figure 9:
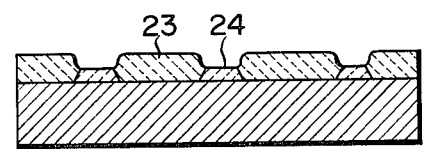

Modified embodiments of the method for forming a three-dimensional pattern by screen printing or transfer will be described hereinafter. In the embodiment shown in FIG. 9, a pattern is printed by screen printing or by transfer on an enamel layer 23 using a frit ink higher in specific weight than the enamel layer 23. In firing, the temperature is raised to a point where the enamel layer 23 is melted. Then the frit ink part sinks into the enamel layer 23, thus forming recessed parts 24. Various finished surfaces may also be obtained by suitably combining the screen printing and transfer methods. Either of these two methods may be repeated for better effects. For example, more than one printing screen, each having a different thickness, may be used for varying the height of the protruding parts in several steps. The luster may also be varied by changing the ink composition. In manufacturing a press plate of this type, the transfer of the ink layer and the firing may be repeated, or firing may be performed after several transfers of the ink layer.

The effects of the present invention will now be summarized. The decorative laminate of the present invention has the following effects and advantages:

(a) The surface of the decorative laminate obtained has a soft gloss (luster) which extremely resembles the surface of pottery and has a three-dimensional pattern on the surface which corresponds to the smooth surface of the enamel layer formed by firing the enamel layer of the press plate. The decorative laminate thus obtained has an outer appearance which extremely resembles that of natural stone or pottery. A decorative laminate which resembles an enamel layer and which has a luster and a three-dimensional pattern similar to those of the enamel layer is obtained even when a colorant of single color is used.

(b) A decorative laminate with protruding parts and recessed parts forming a continuous sinusoidally curved surface can be obtained. Since this decorative laminate does not have sharp edges in the pattern, it is suitable as a decorative laminate resembling enamel or pottery. Further, dust tends not to collect on the surface of the laminate and is easy to remove even when it has collected on the surface.

The manufacturing method of the decorative laminate of the present invention has the following effects or advanages:

(a) A release sheet need not be used in manufacturing a decorative laminate since the releasing properties of the enamel layer on the surface of the molding plate from the resin are greatly superior.

(b) The press plate having an enamel layer can be prepared with ease without requiring complicated processes such as etching and abrasion, resulting in economical manufacture.

(c) In manufacturing a melamine decorative laminate in general, pressures of 50–120 kg/cm² and temperature up to 140°–160° C. are required. Since the embossing plate used in the present invention is fired at a temperature of 500°–1,000° C., it can easily withstand the above-mentioned pressure and heat. The service life of this embossing plate is therefore indefinitely long.

(d) Since the enamel layer has better thermal conductivity than a conventional resin press plate, the manufacturing efficiency is improved.

(e) Since the three-dimensional pattern of the enamel layer consists of smooth curves, dust tends not to collect thereon, and is easy to wipe off when it has collected.

What is claimed is:

1. A method for manufacturing a decorative laminate including the step of hot pressing decorative laminate elements with a press plate that includes a dense enamel layer joined directly to the surface of a metal substrate.

2. The method of claim 1 wherein the enamel layer includes a surface defined by a smooth three-dimensional pattern.

3. The method of claim 1 wherein the enamel layer is formed by adding water and a mill addition agent to glass frit, kneading the mixture, coating the mixture on the metal substrate to form a layer, and thereafter firing the layer.

4. The method of claim 3 further including the step of printing a pattern with frit ink containing glass on the layer prior to the firing of same.

5. The method of claim 4 wherein the enamel layer is defined by protruding portions having at least two different heights.

* * * * *